United States Patent
Sodemann et al.

(10) Patent No.: US 7,104,847 B2
(45) Date of Patent: Sep. 12, 2006

(54) ELECTRIC POWER SYSTEM AND METHOD OF OPERATING THE SAME

(75) Inventors: Wesley C. Sodemann, Dousmah, WI (US); Kenny J. Stair, North Prairie, WI (US); Philip Gull, New Berlin, WI (US)

(73) Assignee: Briggs & Stratton Power Products Group, LLC, Jefferson, WI (US)

(*) Notice: Subject to any disclaimer, the term of this patent is extended or adjusted under 35 U.S.C. 154(b) by 96 days.

(21) Appl. No.: 10/787,638

(22) Filed: Feb. 26, 2004

(65) Prior Publication Data

US 2005/0190512 A1  Sep. 1, 2005

(51) Int. Cl.
*H01R 27/02* (2006.01)
*H01R 11/00* (2006.01)
*H01R 9/11* (2006.01)
*H01B 7/30* (2006.01)
*H02K 7/08* (2006.01)

(52) U.S. Cl. ............... 439/638; 439/502; 439/623; 439/535; 307/147; 290/1 A

(58) Field of Classification Search ............... 290/1 A, 290/2, 4 A, 5, 38 R, 30 A; 439/151, 290, 439/683, 638, 215, 490, 652, 214, 535, 502, 439/623, 150; 310/68 A, 71; 307/147, 150
See application file for complete search history.

(56) References Cited

U.S. PATENT DOCUMENTS

| | | | | |
|---|---|---|---|---|
| 3,350,586 A | * | 10/1967 | Otto | 310/71 |
| 4,123,737 A | | 10/1978 | Hoagland, Jr. | |
| 4,233,534 A | * | 11/1980 | Tharman | 310/71 |
| 4,307,925 A | * | 12/1981 | Drew | 439/622 |
| 4,642,497 A | * | 2/1987 | Boyd, Jr. | 310/68 R |
| 4,771,367 A | | 9/1988 | Serr et al. | |
| 4,867,701 A | | 9/1989 | Wiand | |
| 4,911,652 A | * | 3/1990 | Savoca et al. | 439/282 |
| D307,742 S | | 5/1990 | Serr et al. | |
| 4,928,303 A | * | 5/1990 | Allin et al. | 379/93.05 |
| 4,930,047 A | | 5/1990 | Peterson | |
| 5,035,630 A | * | 7/1991 | Norsworthy | 439/92 |
| 5,167,535 A | | 12/1992 | Kovacik et al. | |
| D332,252 S | | 1/1993 | Kovacik et al. | |
| 5,236,374 A | | 8/1993 | Leonard et al. | |
| 5,315,475 A | | 5/1994 | Scheidel et al. | |
| D357,459 S | | 4/1995 | Warden | |
| D362,229 S | | 9/1995 | Moses | |
| 5,574,612 A | | 11/1996 | Pak | |

(Continued)

OTHER PUBLICATIONS

Charter Township of Delta, Generator Grounding, www.township.delta.mi.us/Building/GENGROUN.HTM, Jun. 6, 2003.

(Continued)

*Primary Examiner*—Julio C. Gonzalez
(74) *Attorney, Agent, or Firm*—Michael Best & Friedrich, LLP

(57) ABSTRACT

A system for providing electric power and a method of controlling the same. The system includes a local power source, a non-neutral-bonded connector electrically connected to the local power source, a neutral-bonded connector, and a conductor. The system also includes a first connector that provides an electrical connection between the non-neutral-bonded connector and the neutral-bonded connector in a first configuration of the system, and a second connector that provides an electrical connection between the non-neutral-bonded connector and the conductor in a second configuration of the system.

25 Claims, 5 Drawing Sheets

U.S. PATENT DOCUMENTS

| | | | |
|---|---|---|---|
| D379,086 S | | 5/1997 | Sipes |
| D383,726 S | | 9/1997 | Nelson |
| 5,727,963 A | * | 3/1998 | LeMaster .................... 439/358 |
| 5,844,765 A | | 12/1998 | Kato et al. |
| 5,936,828 A | * | 8/1999 | Nolan et al. ................ 361/167 |
| 6,035,983 A | | 3/2000 | Benner |
| 6,243,257 B1 | | 6/2001 | Ester |
| 6,313,543 B1 | * | 11/2001 | Frank .......................... 290/1 A |
| 6,365,990 B1 | * | 4/2002 | Flegel .......................... 307/64 |
| 6,414,240 B1 | * | 7/2002 | Flegel .......................... 174/50 |
| 6,476,509 B1 | * | 11/2002 | Chen et al. .................. 290/1 R |
| 6,486,407 B1 | | 11/2002 | Hawker et al. |
| 6,504,268 B1 | * | 1/2003 | Flegel .......................... 307/85 |
| 6,531,790 B1 | * | 3/2003 | Panuce et al. ................ 307/64 |
| 6,761,581 B1 | * | 7/2004 | Takehara et al. ............ 439/502 |
| 6,788,504 B1 | * | 9/2004 | Vanderkolk .................. 361/42 |
| 6,805,579 B1 | * | 10/2004 | Marchand et al. .......... 439/502 |
| 2003/0062723 A1 | * | 4/2003 | Mancl et al. ................ 290/1 A |
| 2005/0012336 A1 | * | 1/2005 | Dull et al. ................... 290/1 A |
| 2005/0031944 A1 | * | 2/2005 | Sodemann et al. .......... 429/150 |
| 2005/0173925 A1 | * | 8/2005 | Farkas ........................ 290/1 A |

OTHER PUBLICATIONS

Mayberry Sales & Service, Inc., Generator Operation, printed from site May 21, 2003, pp. 1-10, www.mayberrys.com/honda/generator/html/operation.htm.

Eaton/ Cutler-Hammer, Emergency Power Solutions, Feb. 2000, pp. 1-8, Publication No. SA.316.09.S.E, Eaton Corporation—Milwaukee, WI—USA.

H. Wilson, H. Wilson's Warehouse Outlet Online Catalog, printed from website Jun. 2, 2003, pp. 1-3, www.hwilson.com/out_elec.html.

Best Buy, Belkin compact Home Series Single-outlet Surge Protectors, BestBuy.com, printed from website Jun. 2, 2003, www.bestbuy.com/detail.asp?e=11190575&m=488&cat=0&scat=0.

Allied Electronics, Multiple Outlet Strips Allied Electronics Catalog, p. 412, Allied Electronics.

Mouser Electronics, Inc., WireMold Surge Suppressors, Power Strips, and Outlet Centers, Mouser Electronics, Inc. Catalog,, Nov.-Feb. 2003, p. 712, Catalog #612, www.mouser.com / Mouser Electronics, Inc.

Middle Atlantic Power Products, 115 Volt Power Strips, Middle Atlantic Products, Inc. Online Catalog, printed Jun. 2, 2003, p. 1, www.middleatlantic.com/ower/vps.htm.

Lind Equipment Ltd., Drop Lights and Extension Cable Reels, printed Jun 2, 2003, pp. 1-4, www.lindequipment.net/lightson.htm—Lind Equipment Ltd.

Eaton / Cutler Hammer, Advanced Residential Products, Jan. 2003, pp. 1-46, vol. 1, www.cutler-hammer.eaton.com.

* cited by examiner

ELECTRIC POWER SYSTEM AND METHOD OF OPERATING THE SAME

FIELD OF THE INVENTION

The present invention relates to an electric power system and, more particularly, an electric power system having a generator (such as a back-up generator) and a method of controlling the electric power system.

BACKGROUND

Generators are used in a variety of different environments. For example, a generator can be used as a secondary or back-up power source for a building (e.g., a residence) or as the primary power source at a construction site. Numerous other situations or uses for a generator are possible.

Bonding the neutral wire of the generator to ground is required in some environments. For example, the U.S. Occupational Safety & Health Administration (OSHA) requires industrial (also referred to as commercial) generators to be neutral bonded, i.e., electrically connecting the neutral wire of the generator to ground. Also, it is typically required to include a ground-fault-circuit interrupt (GFCI) in the industrial generator for detecting ground-fault current.

A breaker box of a building or residence also typically has the neutral wire bonded to ground. If the industrial generator is connected to such a breaker box, a loop is created with the neutral wire of the industrial generator and the ground wire of the breaker box. This potentially induces a current through the neutral and ground wires, which trips the GFCI of the industrial generator.

SUMMARY

In one embodiment, the invention provides a system for providing electrical power. The system includes an alternator, a non-neutral-bonded connector electrically connected to the alternator, a neutral-bonded connector, and first and second cords. The first cord includes a first connector and is electrically coupled to the neutral-bonded connector. The neutral-bonded connector can be part of a multiple receptacle. In a first configuration of the system, the first connector provides a first current path from the non-neutral-bonded connector to the neutral-bonded connector. An example first configuration is the first connector directly coupling with the non-neutral-bonded connector and the first cord coupling with the multiple receptacle. The second power cord includes a second connector and a cable. In a second configuration of the system, the second connector provides a second current path from the non-neutral-bonded connector to the cable. An example second configuration is the second connector directly coupling with the non-neutral-bonded connector. In some constructions, the cable is connected to a building for providing power to the building.

In a second embodiment of the invention, the system includes an alternator, a neutral-bonded connector, a conductor, and a switch connected to the alternator. The switch includes a non-neutral-bonded connector, a first connector, and a second connector. The switch is controllable between a first configuration, or state, where the switch provides a current path from the alternator to the neutral-bonded connector via the non-neutral-bonded connector, and a second configuration, or state, where the switch provides a current path from the alternator to the conductor via the non-neutral-bonded connector and the second connector.

In yet another embodiment of the invention, the system includes an electrical generator, a non-neutral-bonded connector electrically connected to the electrical generator, a neutral-bonded connector, and a conductor. The system also includes a first connector that provides an electrical connection between the non-neutral-bonded connector and the neutral-bonded connector in a first configuration of the system, a second connector that provides an electrical connection between the non-neutral-bonded connector and the conductor in a second configuration of the system, and an electrical power transfer system electrically connected to the conductor in the second configuration of the system.

The invention also provides a method of controlling an electric power system. The method includes generating electric power, providing the electric power to a non-neutral-bonded connector, making a first electrical path from the non-neutral-bonded connector to a neutral-bonded connector, breaking the first electrical path, and making a second electrical path from the non-neutral-bonded connector to a power cord.

Other features and advantages of the invention will become apparent to those skilled in the art upon review of the following detailed description, claims, and drawings.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" and variations thereof herein are used broadly and, unless otherwise stated, encompass both direct and indirect connections, couplings, and mountings. In addition, the terms connected and coupled and variations thereof herein are not restricted to physical and mechanical connections or couplings.

Figure 1:
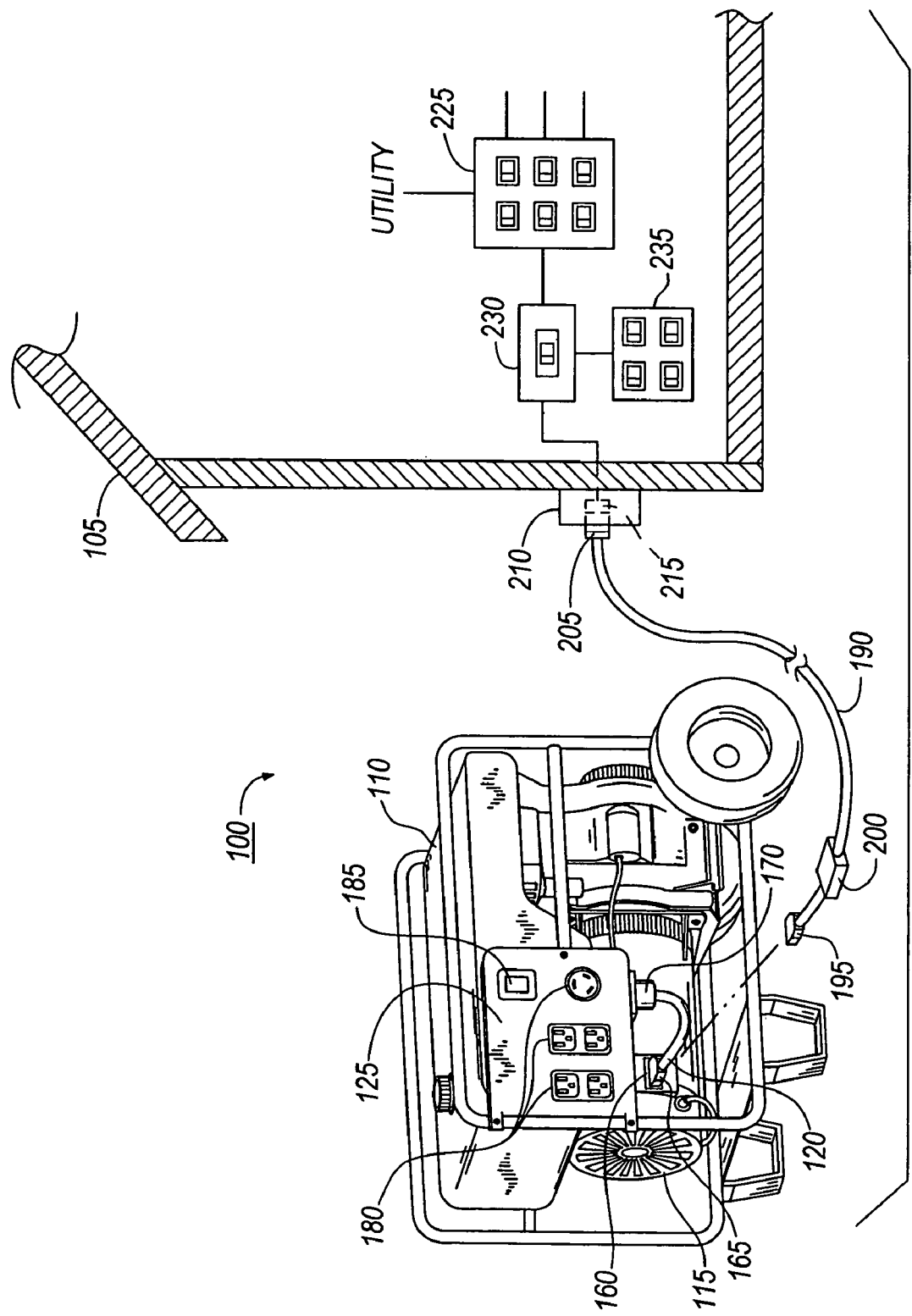
FIG. 1 shows an exemplary electric power system incorporating the invention.

FIG. 1 shows an electric power system 100 having a local power source connected to a building (e.g., a residence) 105. For FIG. 1, the local power source is a portable generator 110, which also is suitable for use as an industrial generator.

However, the invention is not limited to the portable generator 110 shown in FIG. 1. As used herein, the term "generator" means an apparatus or system that converts power or energy (e.g., mechanical, chemical, thermal, etc.) into electric power or energy. Accordingly, other power sources (e.g., power supplies powered by fuel cells or solar cells) and other generator types can be used in the electric power system 100.

Figure 2:
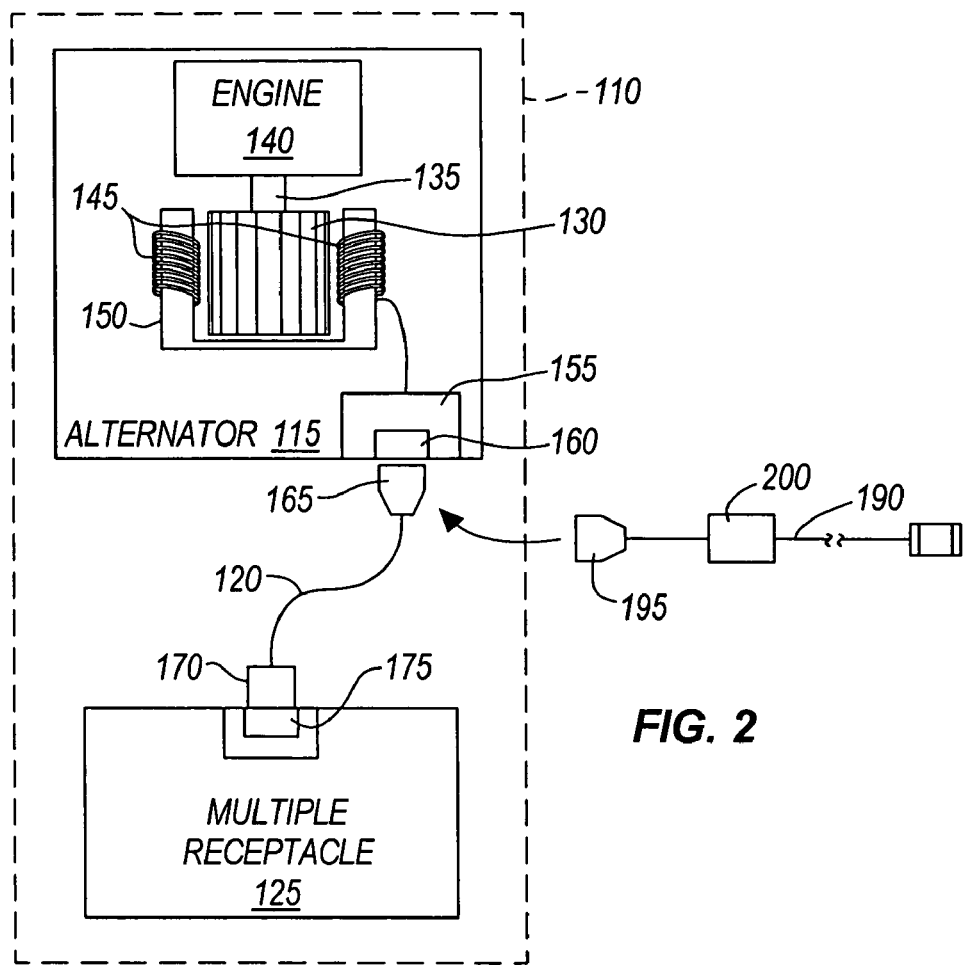
FIG. 2 is a schematic diagram of a portion of the construction of the electric power system of FIG. 1.

As best shown in FIGS. 1 and 2, the portable generator includes an alternator 115, a first power cord 120, and a multiple receptacle 125. The alternator 115 includes a rotor 130 coupled via a shaft 135 to an internal combustion engine 140. The rotor 130 includes magnets that interact with one or more windings 145 of a stator 150 when the engine 140 causes the rotor 130 to rotate. The interaction of the magnets with the winding(s) 145 results in a current produced in the winding(s) 145. Other constructions of the alternator 115 may not include magnets. Rather, these constructions can include a rotor having brushes for supplying power to the stator 150.

The alternator can also include power circuitry 155 electrically connected to the winding(s) 145. The power circuitry 155 receives the current from the winding(s) 145 and regulates the received current to a desired voltage and frequency. The power circuitry 155 can perform other functions, such as conditioning and overcurrent and overvoltage protection. Additionally, it is envisioned that other methods of controlling the alternator 115 can be used to regulate the voltage and frequency of current produced by the alternator 115 such that the power circuitry 155 may not be required or have limited functions. For example, the alternator 115 can be responsive to a throttle control for controlling the speed of the engine 140, thereby controlling the frequency of the current and/or voltage produced in the winding(s) 145.

With reference to FIG. 2, the alternator 115 also includes a connector 160, which is shown as a receptacle. The connector 160 is referred to herein as a non-neutral-bonded connector. As used herein, the term "neutral bonded" refers to electrically connecting (or bonding) the neutral conductor, neutral wire, or neutral point of a circuit, machine, apparatus, or system to ground. The term "neutral-bonded connector" refers to a connector that has the neutral conductor of the connector electrically connected (or bonded) to ground prior to or at the connector. The term "non-neutral-bonded connector" means a connector that does not have the neutral conductor of the connector electrically connected (or bonded) to ground prior to or at the connector. For example, the neutral wire leading to the connector 160 is not bonded from the winding(s) 145 to the connector 160. However, it should be understood, that the connector 160 could be connected to downstream circuitry where the neutral wire is bonded, thereby resulting in the neutral conductor of the connector 160 becoming grounded. However, even in this situation, the connector 160 will still be referred to as a non-neutral-bonded connector.

As shown in FIG. 2, the connector 160 is a receptacle 120. However, the term "connector" is broadly defined herein as any coupling device employed to connect conductors of one circuit or transmission element with those of another circuit or transmission element. It is envisioned that the term "connector" encompasses receptacles, plugs, terminals, junctions, contact points, wipers, and similar electrical connectors. For example and discussed further below, the non-neutral-bonded connector 160 can be a wiper of a switch, or even a junction of an electronic switch.

Figure 5:
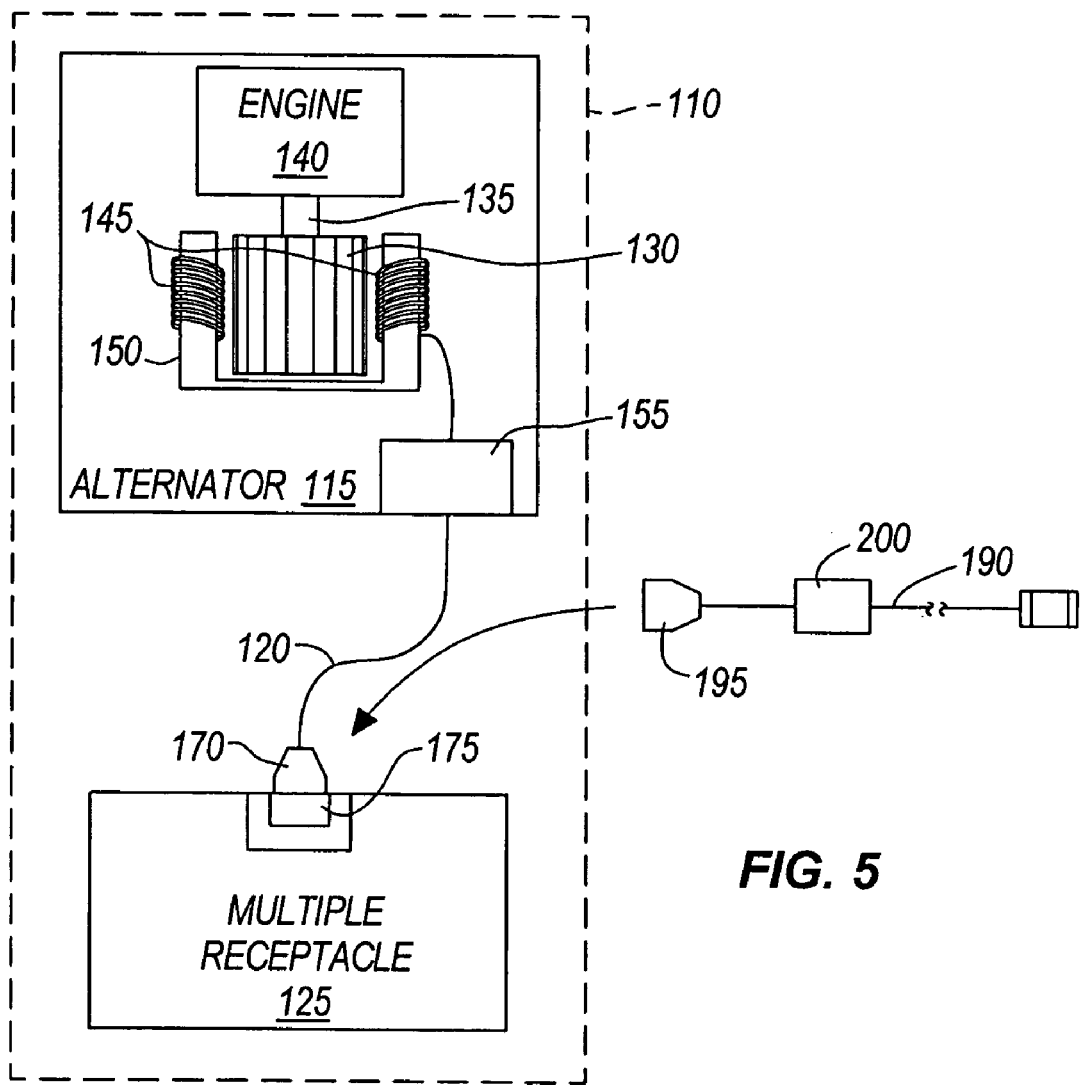
FIG. 5 is a schematic diagram of a portion of a first construction of an electric power system modified from the construction shown in FIG. 1.
Figure 6:
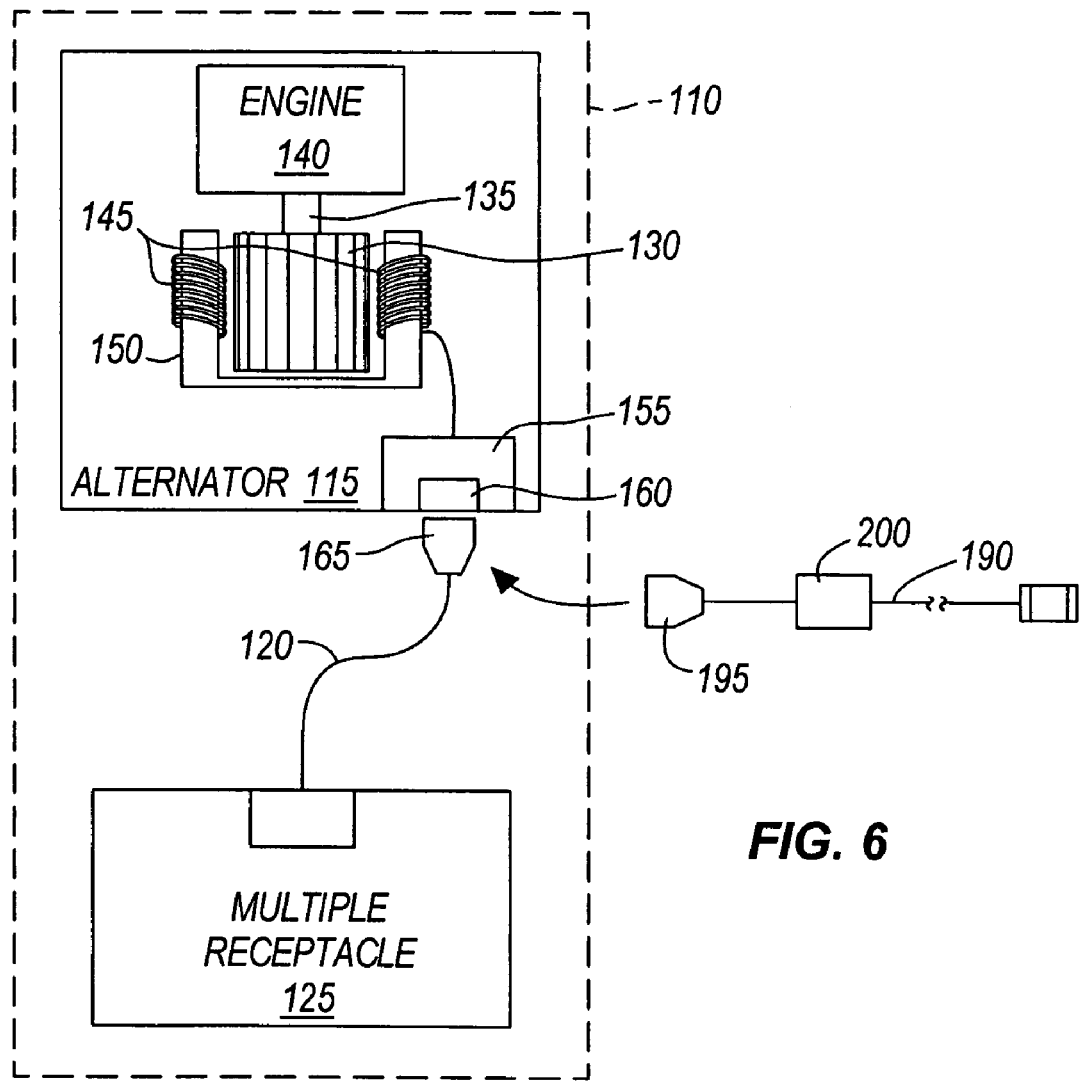
FIG. 6 is a schematic diagram of a portion of a second construction of an electric power system modified from the construction shown in FIG. 1.

Referring again to FIG. 2, the portable generator 110 includes a power cord 120 that electrically connects the non-neutral-bonded connector 160 to the multiple receptacle 125. As used herein, the term "power cord" means a cable having one or more connectors (e.g., one or more receptacles or plugs). The term "cable" means a transmission line (i.e., a conductor) or a group of transmission lines (i.e., a group of conductors) mechanically assembled into a flexible form. FIG. 2 shows the power cord having two connectors, which are two plugs 165 and 170. The term "plug" means a device, usually associated with a cord, which, by insertion in a receptacle (or "outlet"), establishes connection between a conductor or conductors associated with the plug and a conductor or conductors associated with the receptacle. For other constructions, the power cord 120 includes only one plug 165 or 170, and other connector types are possible. For one alternative construction (see FIG. 5), the power cord is hardwired to the power circuitry 155 such that the cord 120 includes a single connector, which is the non-neutral-bonded connector. In yet another construction (see FIG. 6), the power cord is hardwired to the multiple receptacle 125 such that the cord 120 includes a single connector 165.

As shown in FIGS. 1 and 2, the multiple receptacle 125 includes a connector 175. The multiple receptacle 125 is a single device containing two or more receptacles 180. A receptacle is a contact device, normally installed at a fixed location, intended for the mechanical or electrical connection of a plug. The multiple receptacle 125 is neutral-bonded and includes a GFCI 185. To neutral-bond the multiple receptacle 125, the neutral wire(s) of the multiple receptacle is electrically connected to earth ground via the frame of the portable generator 110. Because the multiple receptacle 125 is neutral-bonded, the receptacles 180 are referred to as neutral-bonded connectors. The number of receptacles 180 of the multiple receptacle 125 can vary and provide one or more voltages and/or frequencies. It is also envisioned that the multiple receptacle 125 may be just a single receptacle or include one or more other connector types (e.g., a plug).

For the constructions shown in FIGS. 1 and 2, the circuit path from the one or more windings 145 to the multiple receptacle 125 can be broken by disconnecting the power cord 120 at one of two locations. First, the connectors 160 and 165 can be separated and/or the connectors 170 and 175 can be separated. Depending on the design of the connectors 160 and 170, a second power cord 190 (FIGS. 1–3) can connect to the alternator 115. For example and in one construction, the connector 195 of the power cord 190 can directly couple to the connector 160. Alternatively, the connector 195 can directly couple to the connector 170. When disconnecting the multiple receptacle 125 from the alternator 115 and connecting the power cord 190 to the alternator 115, non-neutral-bonded power is provided to the power cord 190 during operation of the alternator 115.

Figure 3:
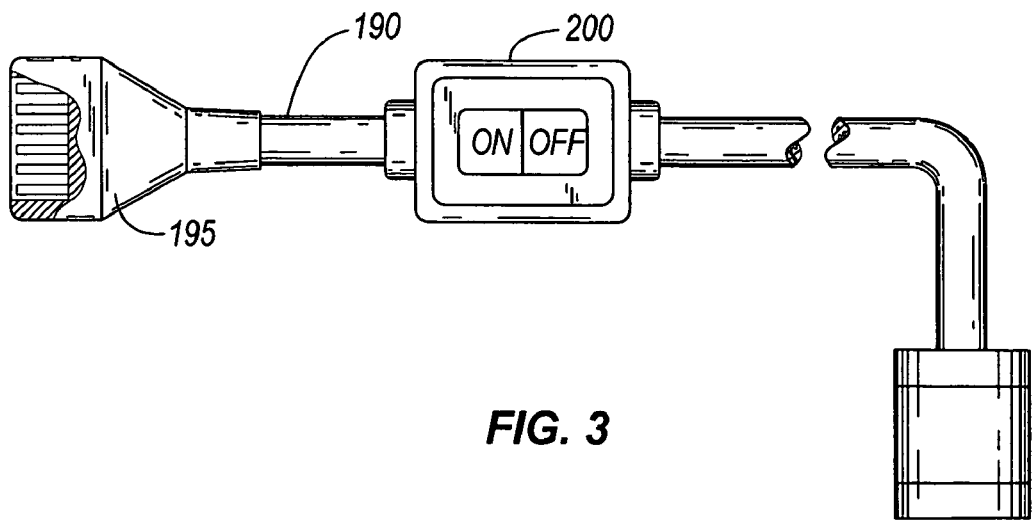
FIG. 3 is a top view of a power cord used in the electric power system of FIG. 1.

Referring to FIGS. 1–3, the power cord 190 further includes a circuit breaker 200 (such as a two-pole circuit breaker). The design of the connector 195 can vary depending on the desired arrangement of the electric system 100. Also, the power cord 190 can include a second connector 205 for connecting to a building as discussed below.

In one construction, the connector 195 has a specialized or nonstandard design, one that is not generally suitable for other applications. For this construction, the mating connector (e.g., connector 160) also includes a specialized or nonstandard design to receive the connector 195. It may also be required that other connectors (e.g., connector 165) include the specialized or nonstandard design. The nonstandard design ensures a greater likelihood that an individual correctly configures the system 100.

Figure 4:
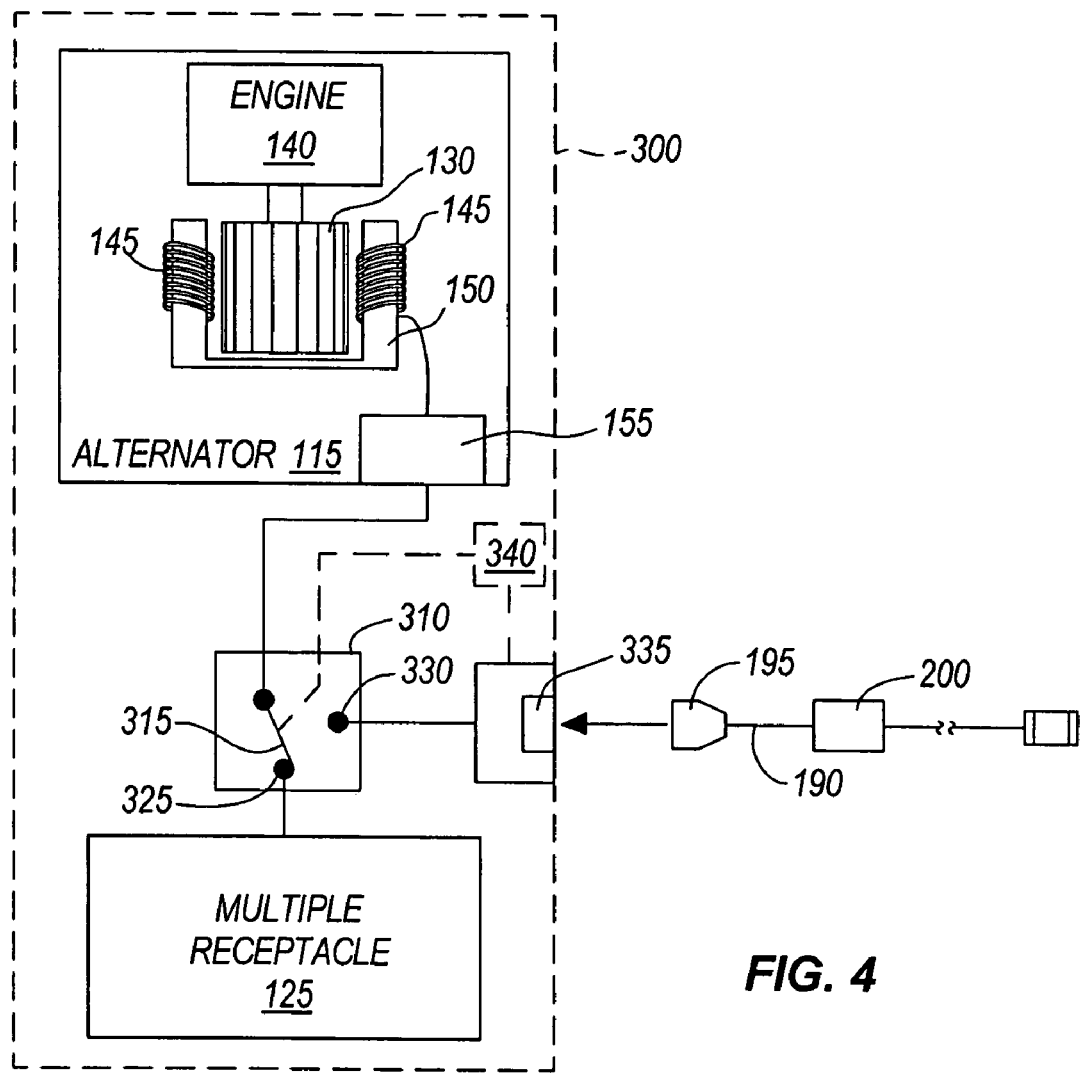
FIG. 4 is a schematic diagram of a portion of another exemplary electric power system incorporating the invention.

FIG. 4 shows an alternative construction of the portable generator. Similar to the earlier construction, the portable generator 300 includes an alternator 115 having an engine 140, a rotor 130, a stator 150, one or more windings 145, and power circuitry 155. The portable generator 300 also includes a multiple receptacle 125 having one or more neutral-bonded connectors, and a switch 310. The term "switch" is broadly defined herein as an electrical, electronic, or mechanical device for opening, closing, or changing a connection (e.g., a connection of a circuit). The switch 310 may be a single switch or may comprise multiple switches to perform a switching function. The switch 310 is schematically shown as including a wiper 315 that wipes between first and second terminals 325 and 330. However, it should be understood that the representation of the switch 310 in FIG. 3 is just a representation. For example, one or more mechanical switches, one or more electromechanical switches, one or more relays, and/or one or more electronic switches can implement the function of the switch 310.

Referring again to FIG. 4, the wiper 315 can also be referred to as the non-neutral-bonded connector. The non-neutral-bonded connector 315 provides a current path with one of the terminals 325 or 330 (which will also be referred to as connectors 325 and 330). When the non-neutral-bonded connector 315 is electrically connected to the connector 325, current can flow from the winding(s) 145 to the neutral-bonded connectors 180, thereby allowing neutral-bonded power at the multiple receptacle 125 during operation of the alternator 115. When the non-neutral-bonded connector 315 connects to the connector 330, current can flow from the one or more winding(s) 145 to the receptacle 335, thereby providing non-neutral-bonded power at receptacle 335 during operation of the alternator 115. The power cord 190 can then be connected to receptacle 335, thereby providing non-neutral-bonded power via the power cord 190. In some constructions, the portable generator 300 includes a sensor (schematically shown as 340) coupled to the receptacle 335. The sensor 340 controls the operation of the switch 310. For example, if the power cord 190 is electrically connected to the receptacle 335, then the sensor 340 controls the connector 315 to provide a current path with connector 330. Conversely, if the power cord 190 is disconnected from the receptacle 335, then the sensor 340 controls the connector 315 to provide a current path with connector 325. However, other methods for controlling the switch 310 are possible.

Referring again to FIG. 1, the power cord 190 is connected to the building 105. For the construction shown, the power cord 190 is connected to a connector (e.g., a receptacle) 215 of the junction box 210. The building 105 can include any number of different arrangements for providing electrical power to electrical loads from either a utility power source or the portable generator 110. For the construction shown, the building 105 includes a main circuit breaker box 225, a transfer switch 230 connected to the junction box 210 and the main circuit breaker box 225, and a second circuit breaker box 235 connected to the transfer switch 230. The breaker boxes 225 and 235 include one or more circuit branches, each of which is connectable to one or more loads. Each circuit branch can include one or more circuit breakers for breaking the electrical path to the loads.

The transfer switch 230 connects the circuit branches of the breaker box 235 to either the primary power source (i.e., the utility) or the secondary power source 110. As used herein, the term "transfer switch" is broadly construed to include one or more switches, one or more relays, and/or one or more contactors, all of which are operable to alternately connect an electrical load to the primary power source or the secondary power source.

Various other features and advantages of the invention are set forth in the following claims.

What is claimed is:

1. A system for providing electrical power comprising:
   a generator;
   a non-neutral-bonded connector electrically connected to the generator;
   a first connector electrically connected to the non-neutral-bonded connector in a first configuration of the system;
   a neutral-bonded connector electrically connected to the first connector in the first configuration;
   a second connector electrically connected to the non-neutral-bonded connector in a second configuration of the system;
   a conductor electrically connected to the second connector in the second configuration;
   a transfer system electrically connected to the conductor in the second configuration;
   wherein the first connector is not electrically connected to the non-neutral-bonded connector in the second configuration and the second connector is not electrically connected to the non-neutral-bonded connector in the first configuration; and
   wherein the first configuration results in neutral-bonded electrical power at the neutral-bonded connector during operation of the generator, and the second configuration results in non-neutral-bonded electrical power at the conductor during operation of the generator.

2. A system as set forth in claim 1 wherein the system further comprises a power cord having the conductor and the second connector.

3. A system as set forth in claim 2 wherein the transfer system is connectable to utility power, the transfer system including a switch adapted to controllably provide power received from one of the utility power and the generator, and wherein the system further comprises a circuit branch connected to the switch and connectable to a load, the circuit branch being adapted to controllably provide power to the load.

4. A system as set forth in claim 3 wherein the power cord further includes a third connector, wherein the system further comprises a fourth connector electrically connected to the transfer switch, and wherein the third connector provides an electrical connection with the fourth connector in the second configuration.

5. A system as set forth in claim 4 wherein each of the connectors is selected from one of a plug and a receptacle.

6. A system as set forth in claim 2 wherein the system further comprises a second power cord including the first connector.

7. A system as set forth in claim 6 wherein the first and second connectors include a nonstandard configuration.

8. A system as set forth in claim 2 wherein the system further comprises a receptacle housing including the neutral-bonded connector and the first connector, and a second power cord including third and fourth connectors.

9. A system as set forth in claim 8 wherein, in the first configuration, the third connector is connected to the non-neutral-bonded connector and the fourth connector connects to the first connector, and wherein, in the second configuration, the third connector is disconnected from the non-neutral-bonded connector.

10. A system as set forth in claim 8 wherein, in the first configuration, the third connector is connected to the nonneutral-bonded connector and the fourth connector is connected to the first connector, and wherein, in the second configuration, the fourth connector is disconnected from the first connector and connects to the second connector.

11. A system as set forth in claim 2 wherein the system further comprises a receptacle housing and a second power cord electrically coupled with the receptacle housing.

12. A system as set forth in claim 11 wherein the receptacle housing includes the neutral-bonded connector and the second power cord includes the first connector, and wherein the first connector is disconnected from the non-neutral-bonded connector in the second configuration.

13. A system as set forth in claim 2 wherein the system further comprises a receptacle housing and a second power cord electrically coupled with the generator.

14. A system as set forth in claim 13 wherein the receptacle housing includes the neutral-bonded connector and the first connector, and the second power cord includes the non-neutral-bonded connector, and wherein the first connector is disconnected from the non-neutral-bonded connector in the second configuration.

15. A system as set forth in claim 1 wherein the system includes a switch and wherein the switch includes the non-neutral-bonded connector, the first connector, and the second connector.

16. A system as set forth in claim 15 wherein the switch includes at least one of a mechanical switch, an electromechanical switch, an electromechanical relay, and an electronic switch.

17. A system as set forth in claim 1 wherein the system further comprises a second neutral-bonded connector and wherein the first connector provides an electrical connection between the non-neutral-bonded connector and the second neutral-bonded connector in the first configuration of the system, the first configuration resulting in neutral-bonded electrical power at the second neutral-bonded connector during operation of the generator.

18. A system as set forth in claim 17 wherein the system further comprises a multiple receptacle having the first and second neutral-bonded connectors.

19. A system as set forth in claim 18 wherein the multiple receptacle includes a ground fault circuit interrupt.

20. A system as set forth in claim 1 wherein the generator includes an engine and an alternator driven by the engine.

21. A system as set forth in claim 20 wherein the alternator includes a rotor interconnected with the engine, and a stator adapted to magnetically interact with the rotor, the stator including a winding, and wherein the system further includes a switch connected to the winding, the switch including the non-neutral-bonded connector, the first connector, and the second connector.

22. A system as set forth in claim 21 wherein the system further includes a third connector, electrically connected to the second connector, that provides the electrical connection between the non-neutral-bonded connector and the conductor in the second configuration of the system.

23. A system as set forth in claim 22 wherein the system further comprises a power cord having the conductor and a fourth connector, and wherein the fourth connector provides a connection with the third connector in the second configuration.

24. A system as set forth in claim 23 wherein the system further comprises a sensor to generate a sensor signal based on the fourth connector connecting to the third connector, and wherein the switch is responsive to the sensor signal.

25. A system as set forth in claim 15 wherein the switch is user controllable.

* * * * *